(12) United States Patent
Pan

(10) Patent No.: US 10,863,202 B2
(45) Date of Patent: Dec. 8, 2020

(54) ENCODING DATA IN A SOURCE IMAGE WITH WATERMARK IMAGE CODES

(71) Applicant: Shaoher Pan, Palo Alto, CA (US)

(72) Inventor: Shaoher Pan, Palo Alto, CA (US)

(*) Notice: Subject to any disclaimer, the term of this patent is extended or adjusted under 35 U.S.C. 154(b) by 0 days.

(21) Appl. No.: 15/177,674

(22) Filed: Jun. 9, 2016

(65) Prior Publication Data

US 2016/0364825 A1 Dec. 15, 2016

(30) Foreign Application Priority Data

Jun. 12, 2015 (CN) .......................... 2015 1 0323333
Jun. 12, 2015 (CN) .......................... 2015 1 0323368
Aug. 18, 2015 (CN) .......................... 2015 1 0504634

(51) Int. Cl.
| | | |
|---|---|---|
| *G06K 9/00* | (2006.01) | |
| *H04N 19/65* | (2014.01) | |
| *H04N 19/136* | (2014.01) | |
| *H04N 19/167* | (2014.01) | |
| *H04N 19/44* | (2014.01) | |
| *H04N 1/32* | (2006.01) | |
| *H04N 1/64* | (2006.01) | |
| *G06T 1/00* | (2006.01) | |
| *G06K 9/46* | (2006.01) | |
| *H04N 19/467* | (2014.01) | |

(52) U.S. Cl.
CPC .......... *H04N 19/65* (2014.11); *G06T 1/0028* (2013.01); *H04N 1/32144* (2013.01); *H04N 1/64* (2013.01); *H04N 19/136* (2014.11); *H04N 19/167* (2014.11); *H04N 19/44* (2014.11); *G06K 9/4652* (2013.01); *H04N 19/467* (2014.11)

(58) Field of Classification Search
None
See application file for complete search history.

(56) References Cited

U.S. PATENT DOCUMENTS

| 7,738,673 | B2 | 6/2010 | Reed | |
|---|---|---|---|---|
| 2004/0001610 | A1* | 1/2004 | Murakami | G06T 1/0028 382/100 |
| 2004/0218782 | A1* | 11/2004 | Brunk | G06T 1/0071 382/100 |
| 2006/0008112 | A1* | 1/2006 | Reed | G06T 1/0028 382/100 |
| 2010/0013872 | A1* | 1/2010 | Masuda | G09G 3/3413 345/691 |
| 2010/0214307 | A1* | 8/2010 | Lee | H04N 1/32187 345/581 |

(Continued)

*Primary Examiner* — Guillermo M Rivera-Martinez
(74) *Attorney, Agent, or Firm* — Fish & Richardson P.C.

(57) ABSTRACT

Methods, systems, and apparatus, including steps of obtaining the source image having a plurality of modules, where a module corresponds to a smallest element that can be encoded in the source image; obtaining input data to be encoded; and encoding the input data in one or more modules of the plurality of modules of the source image. For each respective module of the one or more modules, the encoding includes determining, based on a corresponding value of the input data to be encoded in the respective module, a particular intensity level of multiple intensity levels associated with a particular color, where a number of the multiple intensity levels is greater than two; and encoding the particular color having the particular intensity level in the respective module of the source image.

33 Claims, 5 Drawing Sheets

(56) References Cited

U.S. PATENT DOCUMENTS

| | | | |
|---|---|---|---|
| 2011/0058188 A1* | 3/2011 | Guo | H04N 1/32224 358/1.9 |
| 2012/0154428 A1* | 6/2012 | Barnhoefer | G06T 11/001 345/596 |
| 2012/0274775 A1* | 11/2012 | Reiffel | G06Q 30/0241 348/158 |
| 2013/0156334 A1* | 6/2013 | Margerm | H04N 19/117 382/233 |
| 2014/0177972 A1* | 6/2014 | Demos | H03M 7/24 382/240 |
| 2014/0363093 A1* | 12/2014 | Miller | G06F 3/14 382/235 |
| 2016/0014420 A1* | 1/2016 | Su | H04N 19/30 375/240.08 |
| 2016/0037017 A1* | 2/2016 | Morovic | H04N 1/32309 358/3.28 |
| 2016/0350889 A1* | 12/2016 | Reed | G06T 1/005 |
| 2016/0366444 A1* | 12/2016 | Sullivan | H04N 19/70 |

* cited by examiner

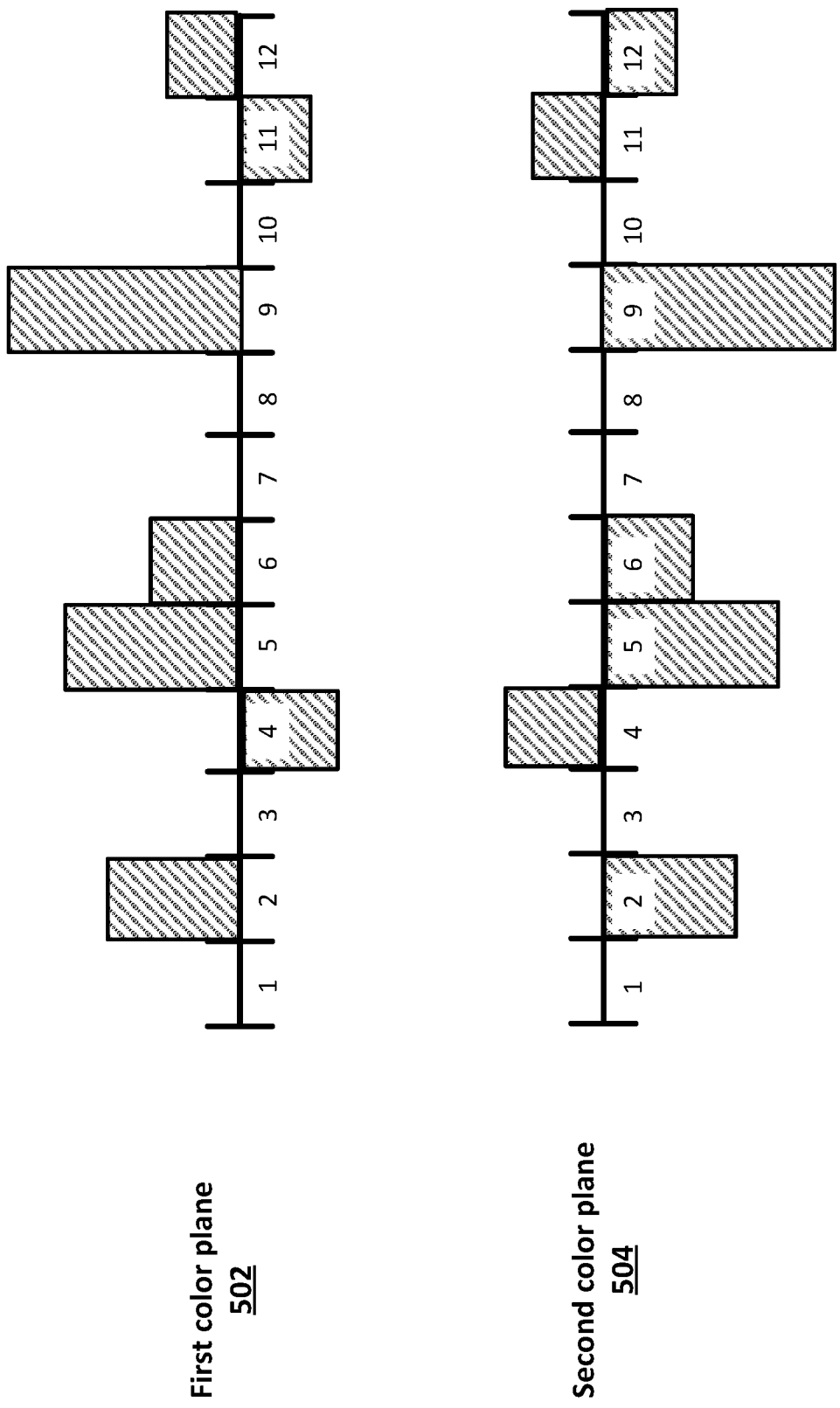

ENCODING DATA IN A SOURCE IMAGE WITH WATERMARK IMAGE CODES

CROSS REFERENCE TO RELATED APPLICATIONS

This specification claims priority to Chinese Patent Application No. 201510323333.2, filed Jun. 12, 2015, Chinese Patent Application No. 201510323368.6, filed Jun. 12, 2015, and Chinese Patent Application No. 201510504634.5, filed Aug. 18, 2015, the contents of which are herein incorporated by reference.

BACKGROUND

This specification relates to bar codes that are encoded with information.

A two-dimensional bar code such as a Quick Response code ("QR code") applies a specific arrangement of black-and-white blocks as logic '0' and '1' over a predefined area to represent specific information. Through image scanning or image capturing devices, the code may be captured and processed by a computing device. A protocol for two-dimensional bar codes has its own specific character set. Each character occupy a certain width. In addition to providing information, the arrangement of the two-dimensional bar code also enables different functions that may help the identification and the decoding of bar codes, such as a rotation correction during processing.

The research of two-dimensional bar code technology started in the 1980's. A variety of codes have been developed, including the PDF417, QR Code, Code 49, Code 16K, and Code One. In general, a two-dimensional bar code provides greater information density than a one-dimensional code. For example, the PDF417 two-dimensional bar code may hold twenty times more information than the one-dimensional bar code CodeC39. Standard setting organizations such the American National Standards Institute (ANSI) has declared the PDF417, QR Code, Code 49, Code 16K, and Code One coding schemes as standard essential. The ISO/IEC 18004:2015 specification also defines the requirements for the QR Code, including the QR Code symbology characteristics, data character encoding methods, symbol formats, dimensional characteristics, error correction rules, reference decoding algorithm, production quality requirements, and user-selectable application parameters. In China, the SJ/T 11349-2006 and the SJ/T 11350-2006 specifications define the standard for two-dimensional bar codes. The research and development for two-dimensional bar code technology in United States, Japan, China and other countries have led to a wide range of applications, including transportation, security, military, and automation management.

Various functional elements may be associated with QR codes. For example, an alignment pattern is a pattern in a fixed reference to the graphics, where decoding software can use it to compensate for moderate image distortions. A character count indicator is a string of bits that represents the number of characters that are being encoded. An extended channel interpretation (ECI) is an embedded piece of information in a bar code symbol that tells the bar code reader details about the references used for encoding the data in the symbol, such that the bar code reader may use the information automatically to select the matching options to decode the symbol. An encoding region is a region for encoding data or error correction code word. A format information string encodes which error correction level and which mask pattern is in use in the current QR code. A function pattern is a non-data element of the QR code that is required by the QR code specification, such as the three finder patterns in the corners of the QR code matrix. A mask pattern changes which modules are dark and which are light according to a particular rule to make it as easy for a QR code reader to scan. An encoding mode uses a particular method for converting the input text into a string of bits. A mode indicator is typically a 4-bit identifier that indicates the encoding mode. Finder patterns are located in three of the four corners, which allow an omni-directional high-speed reading of the code. A white separator typically has a width of one pixel and improves the recognizability of the finder patterns. Terminator bits may be add to a bit string if the bit string is shorter than the total number of required bits. Timing patterns are dotted lines that connect the finder patterns for determining the coordinates of symbols in the code.

A QR code typically can hold about 1000 bytes of information, which corresponds to approximately 500 Chinese characters. Thus, a code that can represent more information than that would be desirable. Moreover, recent developments in code scanning hardware, such as cameras on mobile phones, have allowed better color identification and resolution for a two-dimensional bar code. Accordingly, improvements for the representation of information would be desirable.

SUMMARY

An innovative aspect of the subject matter described in this specification includes a process for encoding data in a source image, where the process includes obtaining the source image having a plurality of modules, where a module corresponds to a smallest element that can be encoded in the source image; obtaining input data to be encoded; and encoding the input data in one or more modules of the plurality of modules of the source image. For each respective module of the one or more modules, the encoding includes determining, based on a corresponding value of the input data to be encoded in the respective module, a particular intensity level of multiple intensity levels associated with a particular color, where a number of the multiple intensity levels is greater than two; and encoding the particular color having the particular intensity level in the respective module of the source image.

These and other embodiments may each optionally include one or more of the following features. For example, the process may further includes identifying an encoding region of the source image for encoding the input data. The encoding may further include encoding the input data in the encoding region of the source image. To identify the encoding region of the source image, a size of the encoding region may be determined based on a predetermined size value. To identify the encoding region of the source image, a size of the encoding region may be determined based on a number of colors for encoding the input data, where the colors for encoding the input data include the particular color. To identify the encoding region of the source image, a size of the encoding region may be determined based on the number of intensity levels associated with the particular color.

The process may include encoding one or more functional elements in the source image. The one or more functional elements may include a finder pattern for determining a position of the encoding region. The one or more functional elements may be encoded in the encoding region.

The process may include obtaining characteristics of the source image. The characteristics of the source image may include a number of colors associated with the source image, a color distribution of the source image, a size of the source image, a module size of the source image, or a number of intensity levels associated with each color of the colors associated with the source image.

To encode the input data, a number of colors for encoding the input data may be determined. For each respective color of the determined colors, a number of intensity levels associated with the respective color for encoding the input data may be determined. To determine the number of intensity levels associated with the respective color, the number of intensity levels associated with the respective color may be determined based on the number of colors.

To encode the particular color having the particular intensity level in the respective module of the source image, the particular color having the particular intensity level and a first phase may be encoded in a first color plane associated with the respective module of the source image. The particular color having the particular intensity level and a second phase may be encoded in a second color plane associated with the respective module of the source image. A difference between the first phase and the second phase may be 180 degrees. To encode the particular color having the particular intensity level in the respective module of the source image, the first color plane and the second color plane may be combined to hide the encoded input data in the source image.

Each module of the plurality of modules may be a pixel of the source image. The input data may include text information, a link to a website, a digital image, an audio file, or a video file.

Another innovative aspect of the subject matter described in this specification includes a process for decoding data embedded in a source image, where the process includes obtaining an encoded source image having a plurality of modules, where a module corresponds to a smallest element that can be encoded in the source image; extracting, from one or more modules of the plurality of modules, encoded data, where the encoded data in each of the one or more modules includes a respective intensity level of multiple intensity levels associated with a particular color, where a number of the multiple intensity levels is greater than two; decoding the encoded data to generate decoded data; and outputting the decoded data.

These and other embodiments may each optionally include one or more of the following features. For example, the process may include reducing noise associated with the encoded source image. To reduce the noise associated with the encoded source image, a mean value filter may be used to reduce the noise associated with the encoded source image. The mean value filter may be a geometric mean value filter. To reduce the noise associated with the encoded source image, a low-pass filter may be used to reduce the noise associated with the encoded source image. The low-pass filter may be a linear low-pass filter or a non-linear low-pass filter. To decode the encoded data, the encoded data may be decoded based on intensity information associated with the one or more modules.

The process may include identifying an encoding region of the encoded source image. To identify the encoding region of the encoded source image, a finder pattern for determining a position of the encoding region may be identified. To extract the encoded data, a first color plane and a second color plane may be extracted from the encoded source image, where the second color plane has been encoded out-of-phase with respect to the first color plane; and the encoded data may be extracted from the first color plane. The decoded data may include text information, a link to a website, a digital image, an audio file, or a video file.

Advantageous implementations may include one or more of the following features. A watermark image code is identifiable and memorable because the encoded information may be hidden in a source image, and thus the encoded image does not simply display as an abstract arrangement of two-dimensional codes. A watermark image code may provide aesthetic effects. A watermark image code may provide additional security and image encryption to eradicate malicious attempts to connect an image capturing device to a server containing a virus. A watermark image code may hold ten or more times the amount of information than that of a QR code, and therefore may allow information to be retrieved by a decoder without communications with a remote server. Functional elements such as alignment patterns for watermark image codes can be hidden in the encoded image.

The details of one or more embodiments of the invention are set forth in the accompanying drawings and the description below. Other features, objects, and advantages of the invention will be apparent from the description and drawings, and from the claims.

BRIEF DESCRIPTION OF DRAWINGS

FIG. 5 an example encoding scheme using out-of-phase information for encoding watermark image codes.

Like reference symbols in the various drawings indicate like elements.

DETAILED DESCRIPTION

Figure 1:
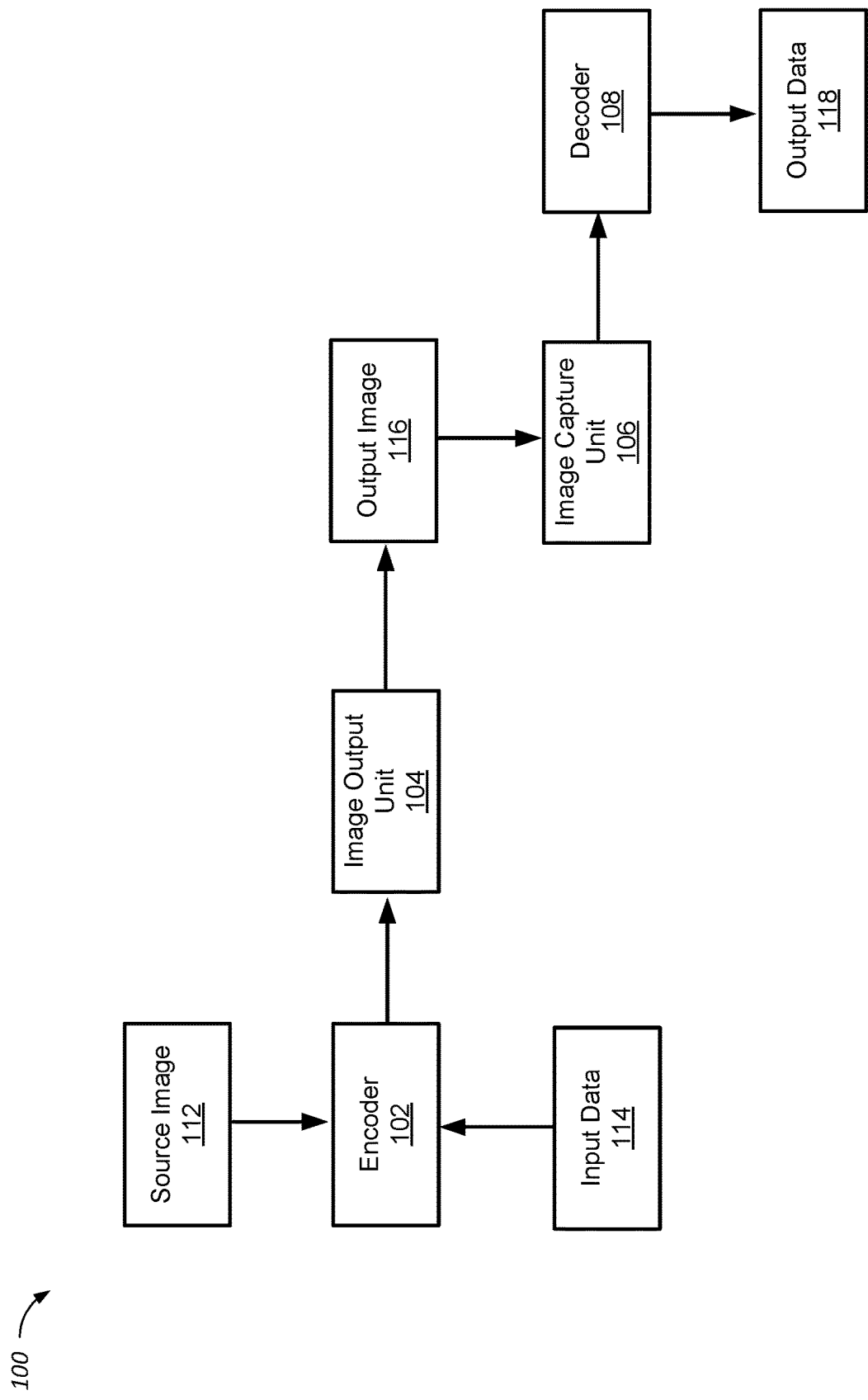
FIG. 1 is a block diagram of a system that illustrates a use of watermark image codes.

FIG. 1 is a block diagram of a system 100 that illustrates a use of watermark image codes. As used in this application, a watermark image code refers to an image code where information has been encoded in a source image using one or more colors and multiple levels of grayscale associated with each color of the one or more colors. As used in this application, a grayscale may correspond to an intensity, a luminance, or a brightness associated with a particular color associated with encoding or decoding an image. A watermark image code may appear to a viewer as a normal image without coding, but the encoded information may be extracted from the encoded source image and be decoded by a decoder. The system 100 includes an encoder 102, an image output unit 104, an image capture unit 106, and a decoder 108.

The encoder 102 is configured to encode input data 114 using a source image 112. An example encoder 102 is described in more detail with respect to the description related to FIG. 2 below. The encoding process is similar to a watermark encoding for a digital image, where the color and/or the grayscale characteristics of specific regions of the source image 112 may be set in order to encode the input data 114.

The source image 112 may be a digital image of a person, a digital image of a scene, or any other type of suitable digital image. The input data 114 may include text or graphic information related to a product or a service, a link to a webpage, source codes to enable an application, or any other suitable data that may be processed by a decoder.

The image output unit 104 receives the encoded source image and generates an output image 116. As an example, the image output unit 104 may generate an output image 116 by printing the encoded source image on a poster to be displayed at a location. As another example, the image output unit 104 may generate an output image 116 by displaying the output image 116 on a digital display. As an example, the image output unit 104 may generate an output image 116 by printing the output image 116 on a label of a consumer product, such as a drink bottle. As another example, the image output unit 104 may generate an output image 116 by transmitting the output image 116 to another device, system, or apparatus. As another example, the image output unit 104 may generate an output image 116 by storing the output image 116 in a computer-readable medium, such as a memory device. As another example, the image output unit 104 may generate an output image 116 by storing the output image 116 in a cloud-computing environment.

The image capture unit 106 is configured to capture the output image 116. The image capture unit 106 may be a digital camera, a digital video-recorder, a smartphone, a scanner, or any other suitable device, system, or apparatus that may be configured to capture the output image 116.

The decoder 108 is configured to decode the output image 116 captured by the image capture unit 106 to extract output data 118. In some implementations, the output data 118 may be an exact copy of the input data 114. In other implementations, the output data 118 may be a lossy copy of the input data 114. After the decoder 108 extracts the output data 118, the decoder 108 may process the output data 118, store the output data 118, and/or provide the output data 118 to another device, system, or apparatus for further processing.

An Encoder for Encoding Watermark Image Codes

Figure 2:
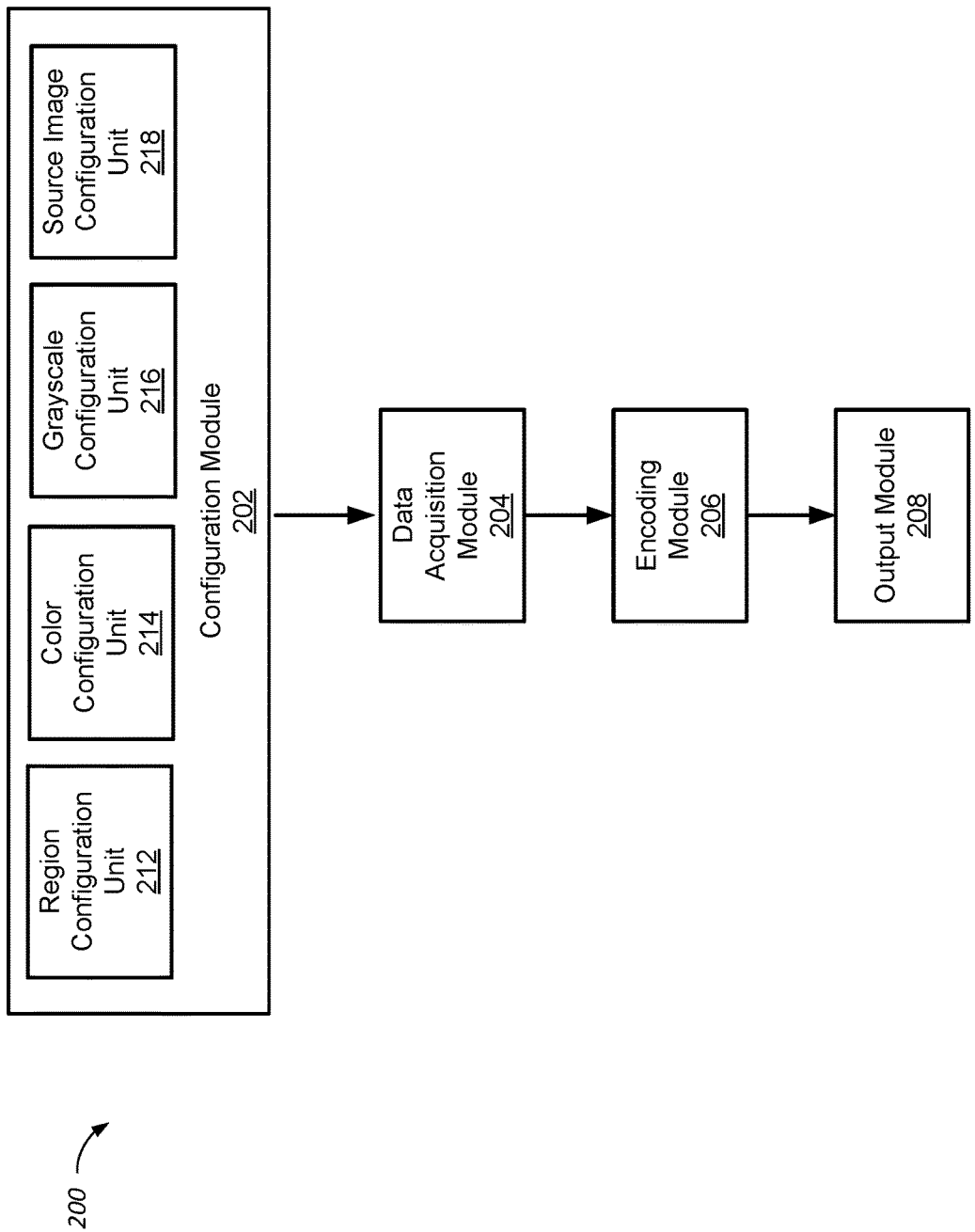
FIG. 2 is a block diagram of an example encoder for encoding watermark image codes.

FIG. 2 shows a block diagram of an example encoder 200 for encoding watermark image codes in a source image. In general, the encoder 200 determines an encoding region for encoding one or more watermark image codes in a source image, obtains input data to be encoded, encodes the input data as one or more watermark image codes in the source image, and outputs the encoded image. The encoding is based on a number of colors and a number of grayscales that are available for encoding. In some implementations, a number of gray scales may be represented by a number of different intensity values of a light source. For example, an 8-bit control panel for a liquid crystal display allows 256 levels of grayscale to be varied for controlling the intensity emitted by a laser diode of a specific color. By using a combination of multiple colors and grayscales, high order watermark image codes may be encoded to achieve a greater capacity than conventional QR codes. In some implementations, the encoded watermark image code is hidden from viewers. For example, typically a QR code has three finder patterns at three corners of an encoding region to specify the boundary of the encoding region. In a watermark image code, the three finder patterns may be encoded using a combination of multiple colors and grayscales in the source image, such that the three finder patterns are hidden from viewers but can be processed by a decoder. In some implementations, the encoded image having one or more encoded watermark image codes may be communicated to another device via a network or using a mobile terminal.

The encoder 200 includes a configuration module 202, a data acquisition module 204, an encoding module 206, and an output module 208. The configuration module 202 is configured to identify one or more encoding regions for encoding watermark image codes. An encoding region may include a data region and one or more function regions. The data region is where the input data may be encoded, and the one or more function regions are where functional elements, such as finder patterns, may be encoded. In some implementations, the data region may be separated from the function regions. In other implementations, the function regions may be included in the data region.

The configuration module 202 may include a color configuration unit 214 configured to determine a number of colors for encoding watermark image codes. The configuration module 202 may also include a grayscale configuration unit 216 to determine a number of grayscales for encoding watermark image codes. For example, the color configuration unit 214 may determine to use two colors, black and red, and the grayscale configuration unit 216 may determine to use 96 levels of grayscale for encoding. This configuration allows 192 (i.e., 2×96) values for encoding a watermark image code. As another example, the color configuration unit 214 may determine to use three colors, red, green, and blue, and the grayscale configuration unit 216 may determine to use 16 levels of grayscale for encoding. This configuration allows 48 (i.e., 3×16) values for encoding a watermark image code.

In some implementations, the determination of the number of colors may depend on the number of grayscales. In some other implementations, the determination of the number of grayscales may depend on the number of colors. For example, the color configuration unit 214 may determine that the number of colors is n, and then the grayscale configuration unit 216 may determine that the number of grayscales is 2×n, where n is an integer. As another example, the color configuration unit 214 may determine that the number of colors is n, and then the grayscale configuration unit 216 may determine that the number of grayscales is a square root of n.

In some implementations, the determination of the number of colors and the number of grayscales may depend on a product of the number of colors and the number of grayscales. For example, if the number of colors is 256, the number of grayscales may be 8. If the number of colors is reduced to 128, the number of grayscales may be increased to 16 such that the product of the number of colors and the number of grayscales is a constant. The flexibility in the determination process allows the encoding to adapt to various hardware and software capabilities.

In some implementations, the configuration module 202 may be configured to determine a number of colors and multiple numbers of grayscales that each corresponds to a respective color. For example, for a first base color (e.g., red), the grayscale configuration unit 216 may determine that the number of corresponding grayscales is n, where n is an integer. For a second base color (e.g., blue), the grayscale configuration unit 216 may determine that the number of corresponding grayscales is k, where k is an integer different from n. In some implementations, the number of grayscales for each color may be dynamically configurable through a user interface.

In some implementations, the configuration module 202 may determine the number of colors and the number of grayscales based on a size of the encoding region. For example, the number of colors and the number of grayscales for encoding may increase with a larger encoding region.

Alternatively, the number of colors and the number of grayscales may decrease with a larger encoding region.

In some implementations, the configuration module 202 may include a region configuration unit 212 configured to determine a dimension for the encoding region, the data region, and/or the function region. As an example, the encoding region may be a predefined 2 cm×3 cm region of an image. As another example, the encoding region may be a 1024 pixel×768 pixel region that would fit a display. In some implementations, the region configuration unit 212 may further be configured to determine a location for the encoding region, the data region, and/or the function regions. As an example, the region configuration unit 212 may determine to repeat finder patterns on every row of the source image. As another example, the region configuration unit 212 may determine to place finder patterns having a predetermined spacing in the source image. As another example, the region configuration unit 212 may determine to place finder patterns on locations of the source image that results in finder patterns hidden from the viewers. As another example, the region configuration unit 212 may determine to place a set of finder patterns that are common to multiple watermark image codes within one encoded source image to increase the capacity of the encoded information.

In some implementations, the region configuration unit 212 may determine a dimension of a data region based on a dimension of the encoding region. For example, if the encoding region is 3×3 mm$^2$, and there are 9 watermark image codes to be encoded, the region configuration unit 212 may allocate a 1×1 mm$^2$ area for each data region.

In some implementations, the region configuration unit 212 may determine a size of the encoding region based on a predetermined size value that is stored in the encoder 200. In some implementations, the region configuration unit 212 may determine a size of the encoding region based on the number of colors and the number of grayscales. The size of the encoding region may increase with more colors and/or more grayscales to be used for encoding the watermark image code. Alternatively, the size of the encoding region may decrease with more colors and/or more grayscales to be used for encoding the watermark image code. Accordingly, the encoding of the watermark image code is flexible depending on the size of the encoding region and/or the number of colors and/or the number of grayscales.

In some implementations, the region configuration unit 212 may determine a shape of the encoding region, the data region, and/or the function region. For example, the encoding region may be a polygon. As another example, the encoding region may be a square. In some implementations, the shape of the encoding region, the data region, and/or the function region may correlate with the number of colors and/or the number of grayscales for encoding. For example, if the shape of the encoding region has more edges, the number of grayscales may be greater. As another example, if the shape of the encoding region has more irregularities, the number of grayscales may be greater. As another example, if the shape of the data region has more edges, the number of grayscales may be greater. This enables flexibility for encoding a source image having irregular shapes, such as an image of an oil painting.

In some implementations, a size of the data region may depend on a size the encoding region, a number of colors, and/or a number of grayscales. For example, the size of the data region may be positively or negatively correlated with the size of the encoding region depending on a configuration of the configuration module 202. As another example, the size of the data region may be either positively or negatively correlated with the number of colors depending on a configuration of the configuration module 202. As another example, the size of the data region may be either positively or negatively correlated with the number of grayscales depending on a configuration of the configuration module 202.

In some implementations, the determination of the number of colors and/or the number of grayscales may depend on the size of the input data. For example, for an article having a small size, the color configuration unit 214 and the grayscale configuration unit 216 may determine that three colors and 8 grayscale levels would be sufficient to encode the article. On the other hand, for a video having a larger size, the color configuration unit 214 and the grayscale configuration unit 216 may determine that 32 colors and 64 grayscale levels would be required to encode the article.

In some implementations, the determination of the number of colors and/or the number of grayscales may depend on characteristics of the source image. For example, the color configuration unit 214 may sample a source image to determine the number of colors associated with the source image. The color configuration unit 214 may then determine the number of colors to be used for encoding the data based on the number of colors associated with the source image. Similarly, the grayscale configuration unit 216 may sample a source image to determine the number of grayscales associated with the source image, and then determine the number of grayscales to be used for encoding the data based on the number of grayscales associated with the source image. This technique may help reduce the visible changes in the source image after the encoding process.

In some implementations, based on the determination of the encoding region, the number of colors, and the number of grayscales, the configuration module 202 may determine whether to use the determined color values, the determined grayscale values, or a combination of both for encoding watermark image codes.

In some implementations, the configuration module 202 may include a source image configuration unit 218 that is configured to obtain a source image that is used for the watermark image code encoding. The source image configuration unit 218 may obtain a source image by capturing a digital image using a camera device, by accessing an image from a local or a remote database, by dynamically generating an image, or by any other suitable ways.

The data acquisition module 204 is configured to obtain input data for encoding. The input data may include text and/or graphical information related to a product or a service, a link to a webpage, source code to enable an application, an audio file, a video file, or any other types of data that may be processed by a decoder.

The encoding module 206 is configured to encode the input data as one or more watermark image codes in the source image. In some implementations, the encoding module 206 may encode the input data as the one or more watermark image codes in a square region of the source image. In other implementations, encoding module 206 may encode the input data as one or more watermark image codes in a rectangular region of the source image. Based on the determined encoding region, the number of colors, and/or the number of grayscales, the encoding module 206 may encode the input data as a watermark image code by modifying the pixel properties such as color and/or intensity at predetermined locations of the source image.

In some implementations, the encoding module 206 may adjust a size of a watermark image code or crop a portion of a watermark image code. For example, the encoding module 206 may adjust a size of a watermark image code to avoid encoding in certain regions of the source image.

In some implementations, the encoding module 206 may encode one or more functional elements in a function region of an encoding region. For example, the encoding module 206 may encode an alignment pattern, finder patterns, or any suitable functional elements that may be processed by a decoder.

In some implementations, the encoding module 206 may determine whether the size of the input data exceeds a threshold size for a watermark image code. In response to determining that the size of the input data exceeds the threshold size for a watermark image code, the encoding module 206 may encode a second watermark image code in the source image. Thus, a large data file may be encoded using multiple watermark image codes within a source image. In some implementations, if a large data file is represented by multiple watermark image codes within a source image, functional elements may be encoded in the source image indicating that multiple watermark image codes have been encoded. For example, a functional element may inform the user that a next chapter of a book is available by scanning another watermark image code in the source image.

The output module 208 is configured to output the encoded source image as an output image. As an example, the output module 208 may generate an output image by printing the encoded source image on a poster. As another example, the output module 208 may generate an output image by displaying the encoded source image on a digital display. As an example, the output module 208 may generate an output image by printing the encoded source image on a label of a consumer product such as a drink bottle. As another example, the output module 208 may generate an output image by transmitting the encoded source image to another device, system, or apparatus. As another example, the output module 208 may generate an output image by storing the encoded source image in a computer-readable medium such as a memory device. As another example, the output module 208 may generate an output image by storing the encoded source image in a cloud-computing environment.

Several examples are described below to illustrate the benefit of encoding a watermark image code based on colors and grayscales.

For one-dimensional black-and-white bar codes having x strips, the bar codes can hold $2^x$ different values of information. For example, a one-dimensional black-and-white bar code having one strip can hold 1 bit (i.e., 0 or 1), and therefore can hold 2 (i.e., $2^1$) different values. As another example, a one-dimensional black-and-white bar code having two strips can hold 2 bits, and therefore can hold 4 (i.e., $2^2$) values of information. As another example, a one-dimensional black-and-white bar code having three strips can hold 3 bits, and therefore can hold 8 (i.e., $2^3$) values of information.

For one-dimensional grayscale bar codes having n levels, x strips of bar codes can hold nx values of information. For example, a one-dimensional grayscale bar code having 1 grayscale and 10 strips can hold $2^{10}$ bits of information. As another example, a one-dimensional bar code having 4 grayscales and 10 strips can hold $4^{10}$ bits of information. As another example, a one-dimensional bar code having n grayscales and 10 strips can hold $n^{10}$ bits of information. Accordingly, the amount of information that can be stored in an image encoded with grayscale is more than the amount of information that can be stored in an image encoded with black-and-white.

Moreover, for two-dimensional grayscale bar codes having n levels and x strips in each direction, a code can further be increased to hold $n^{(2x)}$ bits of information. For example, a two-dimensional grayscale bar code having 1 grayscale and 10 strips can hold $2^{20}$ bits of information. A two-dimensional bar code having 4 grayscales and 10 strips can hold $4^{20}$ bits of information. A two-dimensional bar code having n grayscales and 10 strips can hold $n^{20}$ bits of information. Accordingly, the amount of information that can be stored in an encoded image is further increased by extending the encoding dimension from one-dimensional to two-dimensional coding.

For two-dimensional watermark image codes having k numbers of colors, n levels of grayscales and x strips in each direction, a code can further be increased to hold $k \cdot n^{(2x)}$ bits of information. For example, a two-dimensional watermark image code having 3 base colors (e.g., red, blue, and green), n levels of grayscales and x strips can hold $3n^{20}$ bits of information. As another example, a two-dimensional watermark image code having 64 base colors, n levels of grayscales and x strips can hold $64n^{20}$ bits of information. Accordingly, the amount of information that can be represented by two-dimensional watermark image codes can support storing rich content such as an entire digital book, a photo album, an audio, a game, and/or a video.

In some implementations, at least one data region may be encoded to store contextual information including the number of colors used, the number of grayscales used, an indication for whether colors were used in the encoding, an indication for whether grayscales are used, and/or any other information related to the encoding of watermark image codes. As an example, one encoded data region may be encoded with a two-dimensional black-and-white bar code that stores the contextual information to be retrieved by a decoder. As another example, one encoded data region may be encoded with a two-dimensional grayscale bar code that stores the contextual information to be retrieved by a decoder. As another example, one encoded data region may be encoded with a two-dimensional watermark image code that stores the contextual information to be retrieved by a decoder.

In some implementations, security features may be encoded in a watermark image code to prevent malicious content encoded in barcodes from harming user devices. For example, a security code may be encoded in a function region of a watermark image code to indicate a link status of the user. When the user scans the watermark image code using a user device, if the decoded data triggers a possible connection from the user device to an external server, the security code would inform the user about the connection attempt and offer the user a choice to establish the connection or not. In some implementations, a security code may be coded in one of the three finder patterns. In some implementations, a security code may be coded in a function region only if the data includes instructions that would trigger a connection from the user device to an external server.

In some implementations, notification features may be encoded in a watermark image code to alert a user of a potential transaction. For example, a notification code may be encoded in a function region of a watermark image code to indicate a link status of the user. When the user scans the watermark image code using a user device, if the decoded data triggers a connection from the user device to an external server such as a payment server, the notification code would inform the user about the attempt for the connection and offer the user a choice to establish the connection or not. In some implementations, a notification code may be coded in one of the three finder patterns. In some implementations, a notification code may be coded in a function region only if the data includes instructions that would trigger a connection from the user device to an external server.

In some implementations, a predetermined tolerance level may be applied in the encoding process. For example, if the number of grayscales is 16, the tolerance level may be 30%. As another example, if the number of grayscales is 64, the tolerance level may be 20%. As another example, if the number of colors is 16, the tolerance level may be 30%. As another example, if the number of colors is 64, the tolerance level may be 20%. Having a built-in tolerance level may improve the error rate associated with retrieving and decoding watermark image codes.

As a potential application, information associated with a person may be encoded as watermark image codes in a digital picture of the person. Thus, by capturing the person's digital photo using a mobile phone, the information associated with the person can be automatically retrieved by the mobile phone.

A computer-implemented method may perform the following steps to encode a watermark image code, including identifying an encoding region of a source image for encoding the watermark image code; determining a number of colors and a number of grayscales for encoding the watermark image code; obtaining input data for encoding; generating an encoded source image by encoding, based on the number of colors and the number of grayscales, the input data as the watermark image code in the encoding region of the source image; and outputting the encoded source image.

A Decoder for Decoding Watermark Image Codes

Figure 3:
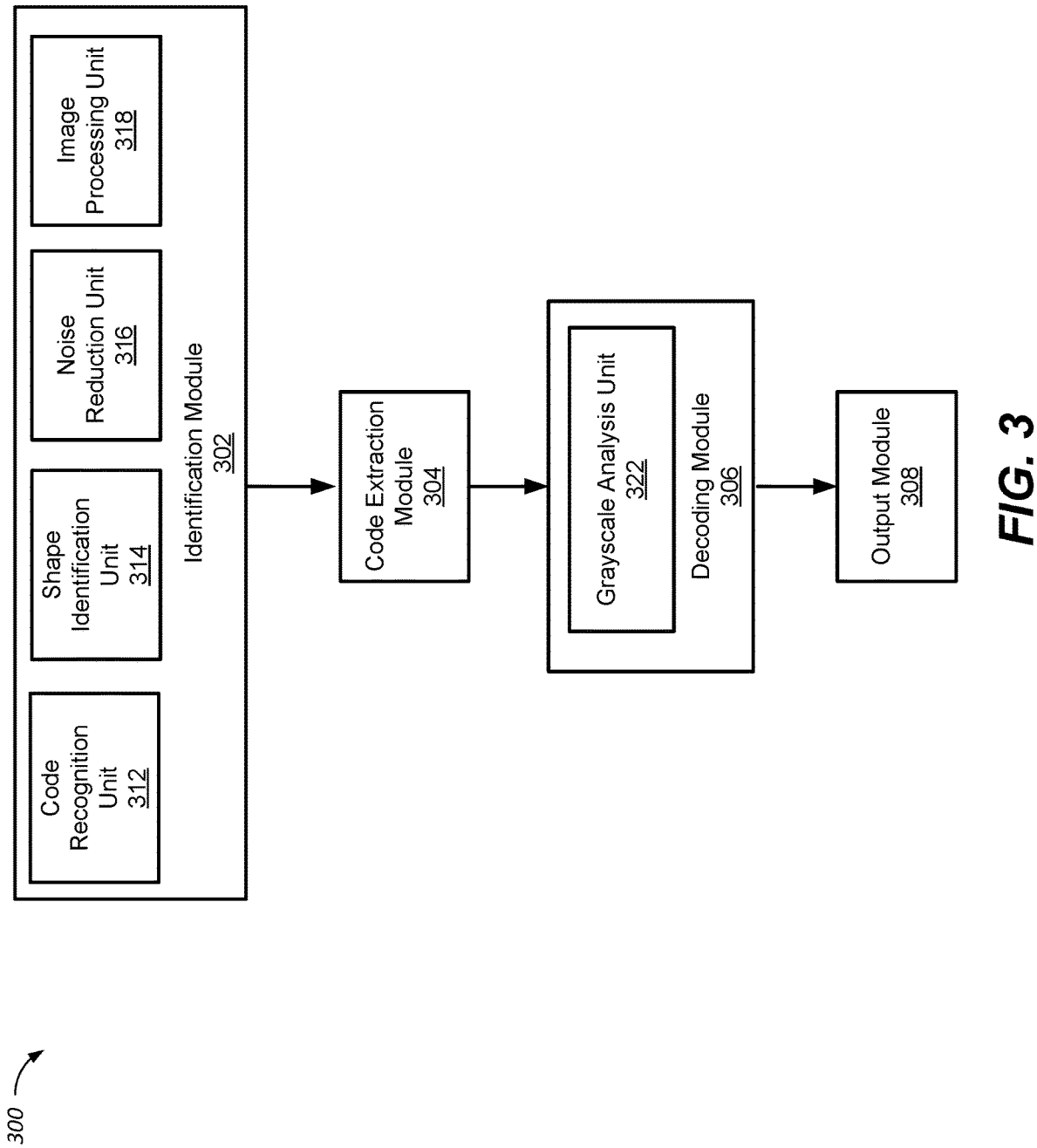
FIG. 3 is a block diagram of an example decoder for decoding watermark image codes.

FIG. 3 is a block diagram of an example decoder 300 for decoding watermark image codes. In general, the decoder 300 receives an image that has been encoded with one or more watermark image codes, and generates output data that can be further processed by another device, system, or apparatus. The decoder 300 includes an identification module 302, a code extraction module 304, a decoding module 306, and an output module 308. The identification module 302 is configured to identify a watermark image code in a received image. The code extraction module 304 is configured to extract encoded data including color information and/or grayscale information in the watermark image code. The decoding module 306 is configured to decode the encoded data. The output module 308 is configured to output the decoded data.

In some implementations, the identification module 302, the code extraction module 304, the decoding module 306, and the output module 308 may communicate via transceivers. For example, the identification module 302 may include a first transceiver that is configured to transmit the watermark image code to the code extraction module 304. The code extraction module 304 may include a second transceiver that is configured to transmit the encoded data to the decoding module 306. The decoding module 306 may include a third transceiver that is configured to transmit the decoded data to the output module 308. The output module 308 may include a fourth transceiver that transmit the output data to another device, system, or apparatus for further processing.

In some implementations, the identification module 302 may include a code recognition unit 312 that is configured to determine whether a received image includes one or more watermark image codes. In response to determining that the received image includes one or more watermark image codes, the code extraction module 304 then extracts the encoded data from the one or more watermark image codes. The code recognition unit 312 may determine whether a received image includes one or more watermark image codes based on whether the received image includes a particular identifier. Alternatively or additionally, the code recognition unit 312 may determine whether a received image includes one or more watermark image codes based on whether the received image includes one or more finder patterns. In some implementations, the code recognition unit 312 may first determine whether the received image includes a two-dimensional bar code. In response to determining that the received image includes a two-dimensional bar code, the code recognition unit 312 may then determine whether the two-dimensional bar code is a watermark image code. In response to determining that the two-dimensional bar code is a watermark image code, the code extraction module 304 then extracts the encoded data from the watermark image code.

In some implementations, the code recognition unit 312 may determine a boundary of a watermark image code. In response to determining the boundary of the watermark image code, the code recognition unit 312 may then determine whether a received image includes one or more watermark image codes.

In some implementations, the code recognition unit 312 may determine whether a region in the received image includes a functional element such as a finder pattern. In some implementations, the code recognition unit 312 may determine whether a region in the received image includes a data region. In some implementations, the code recognition unit 312 may determine whether a region in the received image includes contextual information including the number of colors used, the number of grayscales used, an indication of whether colors were used in the encoding, an indication of whether grayscales are used, and/or any other information related to the encoding of watermark image codes.

In some implementations, the identification module 302 includes a shape identification unit 314. The shape identification unit 314 may be configured to determine contextual information based on a shape of a region of a watermark image code. The shape of the encoding region, the data region, and/or the function region may correlate with the number of colors and/or the number of grayscales for encoding. For example, if the shape of the encoding region has more edges, the number of grayscales may be greater. As another example, if the shape of the encoding region has more irregularities, the number of grayscales may be greater. As another example, if the shape of the data region has more edges, the number of grayscales may be greater. Accordingly, based on the identified shape of the encoding region, the data region, and/or the function region, contextual information such as the number of colors and/or the number of grayscales used for encoding may be determined.

In some implementations, the identification module 302 includes a noise reduction unit 316 configured to reduce noises associated with watermark image codes. For example, the noise reduction unit 316 may include a mean value filter. The mean value filter may be a geometric mean value filter. As another example, the noise reduction unit 316 may include a low-pass filter. In some implementations, the identification module 302 may be configured to take several snap shots of the encoded image using an image capturing device. The noise reduction unit 316 may be used to average the multiple snap shots of the encoded image to reduce the noise associated with the watermark image code. In some implementations, the identification module 302 may be configured to take a noisy snap shot of the encoded image using an image capturing device. The noise reduction unit 316 may transmit the noisy snap shot to a remote server, where the remote server would identify the encoded image and transmit a clean version of the encoded image to the decoder 300.

In some implementations, the identification module 302 may include an image processing unit 318 configured to adjust the received image. For example, when a user captures an encoded image using a smartphone camera, the image may need to be adjusted. The image processing unit 318 may adjust a tilt, a rotation, a distortion, a skew and/or other defect based on suitable functional elements that can be encoded in a watermark image code.

The code extraction module 304 is configured to extract encoded data including color information and/or grayscale information in the watermark image code. After the identification module 302 identifies one or more watermark image codes in a received image, the code extraction module 304 extracts the encoded data from the data regions of the one or more watermark image codes. The code extraction module 304 may then extract the color information and/or grayscale information from the data regions of the watermark image codes. For example, the code extraction module 304 may extract a number of grayscales, a number of colors, the values of the colors, and/or the values of the grayscales used for decoding the watermark image codes.

The decoding module 306 is configured to decode the encoded data based on the color information and/or the grayscale information. For example, the decoding module 306 may decode a module of the encoded data based on its color information and/or its grayscale information. A module is a smallest element that can be encoded in a two-dimensional bar-code.

In some implementations, the decoding module 306 may include a grayscale analysis unit 322 configured to determine grayscale information based on color information. The determination of the number of grayscales may depend on the number of colors. For example, the code extraction module 304 may determine that the number of colors is n, and then the grayscale analysis unit 322 may determine that the number of grayscales is 2×n, where n is an integer. As another example, the code extraction module 304 may determine that the number of colors is n, and then the grayscale analysis module 322 may determine that the number of grayscales is a square root of n. In some implementations, the determination the number of grayscales may depend on a product of the number of colors and the number of grayscales. For example, if the number of colors is 256, the grayscale analysis unit 322 may determine that the number of grayscales may be 8. If the number of colors is reduced to 128, the grayscale analysis unit 322 may determine that the number of grayscales is increased to 16 such that the product of the number of colors and the number of grayscales is a constant.

In some implementations, a number of grayscales is the same for all colors that are included in the colors used to encode the watermark image code. In some other implementations, a number of grayscales is a different number for each color used to encode the watermark image code. For example, for a first base color (e.g., red), the grayscale analysis unit 322 may determine, based on contextual information, that the number of corresponding grayscales is n, where n is an integer. For a second base color (e.g., blue), the grayscale analysis unit 322 may determine, based on con-textual information, that the number of corresponding grayscales is k, where k is an integer that is different from n.

The output module 308 is configured to output the decoded data. The output module 308 may output the decoded data to a digital display. The output module 308 may transmit the decoded data to another device, system, or apparatus. The output module 308 may store the decoded data in a computer readable medium. The output module 308 may output the decoded data to any other suitable means. The decoded data may include text and/or graphical information related to a product or a service, a link to a webpage, source code to enable an application, an audio file, a video file, or any other types of suitable data.

A computer-implemented method may perform the following steps to decode a watermark image code, including identifying a watermark image code in a received image; extracting encoded data including color information and grayscale information in the watermark image code; decoding the encoded data to generate decoded data; and outputting the decoded data.

A Method for Generating Watermark Image Codes

Figure 4:
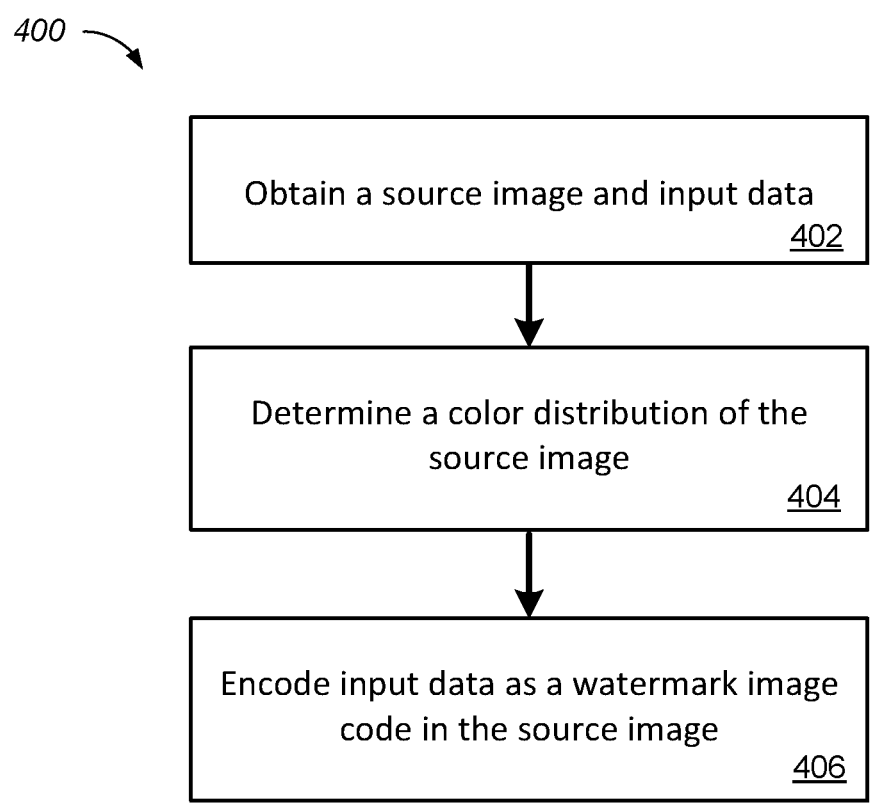
FIG. 4 is a flow diagram that illustrates an example of a process for encoding watermark image codes.

FIG. 4 shows a flow diagram that illustrates an example of a process for encoding watermark image codes. The process may be performed by a system that is configured to encode watermark image codes such as the encoder 102 or the encoder 200.

The system obtains a source image and input data (402). The source image may be obtained by capturing a digital image using a camera device, by accessing an image from a local or a remote database, by dynamically generating an image, or by any other suitable method. The input data may include text and/or graphical information related to a product or a service, a link to a webpage, source code to enable an application, an audio file, a video file, or any other types of data that may be processed by a decoder.

The system determines a color distribution of the source image based on a predetermined configuration (404). The predetermined configuration may include one or more rules for encoding and/or information associated with the source image or the input data. In some implementations, the system may set the predetermined configuration. For example, the predetermined configuration may include a rule for keeping the dimensions of the source image the same after the encoding. As another example, the predetermined configuration may include a rule identifying specific regions that can be used for encoding watermark image codes. As another example, the predetermined configuration may include information related to a resolution and/or dimensions of the source image. As another example, the predetermined configuration may include information related to a resolution and/or dimensions of the watermark image codes, such as a size of a module to be encoded. In some implementations, the system may set the predetermined configuration by retrieving the predetermined configuration from a server. In some implementations, the system may set the predetermined configuration based on actual or expected characteristics of the receiving user. For example, the system may set the predetermined configuration based on an expected camera resolution of a mobile phone. As another example, the system may set the predetermined configuration based on an expected storage capability of a mobile phone. Accordingly, the setting of the predetermined configuration allows the system to encode the watermark image codes with high flexibility.

In some implementations, the system determines a color distribution of the source image based on the number of colors and/or the number of grayscales for encoding the watermark image codes. For example, if the number of colors is 3, the system may map the color distribution of the source image into 3 different categories (e.g., red, green, and blue). As another example, if the number of colors is 256, the system may map the color distribution of the source image into 256 different categories. As another example, if the number of colors is 3 and the number of grayscales is 3, the system may map the color distribution of the source image into 9 different categories. This flexibility allows the system to determine a color distribution of the source image according to the specification of the image capturing device and/or the decoder.

In some implementations, the system determines a color distribution of the source image based on a resolution of the watermark image codes. For example, if the resolution is 10-by-10 pixels, the source image may be divided into sub-regions having 10-by-10 pixel squares, and the system may determine a color distribution in each sub-region. The resolution does not need to be a square. In some implementations, a resolution can be another shape. If there are multiple colors in a sub-region, the system may average the color values to determine a representative color for the sub-region. This flexibility allows the system to determine a color distribution of the source image according to the specification of the image capturing device and/or the decoder.

Based on the color distribution of the source image, the system encodes the input data as a watermark image code in the source image (406).

The encoding of the input data may be achieved by varying a combination of color and grayscale (i.e., intensity) associated with the area (e.g., a pixel) being encoded. For example, if the number of colors is 3 (e.g., red, blue, and green), and the number of grayscales is 16, there are 48 possible values for encoding. As another example, if the number of colors is 8, and the number of grayscales is 64, there are 512 possible values for encoding. In some implementations, the number of colors and the number of grayscales are the same. For example, if the number of colors is 256, the corresponding number of grayscales will also be 256 for each color, and there will 65536 possible values for encoding.

In some implementations, the system may store a table that maps the number of colors to corresponding color values. For example, if the system determines that the number of colors is 3, the system may use the table to determine the colors are red, green, and blue. As another example, if the system determines that the number of colors is 7, the system may use the table to determine the colors are red, orange, yellow, green, blue, indigo, and violet. The colors may be represented as their respective RGB values in the RGB color space or any other suitable representation.

In some implementations, a watermark image code may include one or more finder patterns for determining a position of the watermark image code. A finder pattern may be any two-dimensional arrangement of color and/or grayscale values that can be recognized by a decoder. For example, a finder pattern may be a black frame that surrounds the source image. As another example, a finder pattern may be a portion of the source image that preserves the color distribution of the source image. In some implementations, the finder pattern appears as a blank pattern. For example, a finder pattern may be a white region in the source image.

In some implementations, the system may generate the watermark image code based on a size of the source image. For example, if the width and the height of the source image is 5 mm and 2 mm respectively, the system may generate a watermark image code having the same dimensions. As another example, if the width and the height of the source image is 5 mm and 2 mm respectively, and 5 watermark image codes need to be encoded, the system may generate a watermark image code having a dimension of 1 mm by 1 mm.

In some implementations, the system may determine a size of the watermark image code based on the predetermined configuration. For example, the watermark image code may be encoded in a 1 mm*1 mm region, a 2 mm*1 mm region, or any other configuration as defined by the predetermined configuration.

A module is a smallest element that can be encoded in a two-dimensional bar-code. For example, in QR code, a module is a square in the code that can be represented as black or white. Assuming that a two-dimensional bar code has M modules and each module may be represented by N possible values, the capacity of the two-dimensional bar code may be represented as $M*\log_2 N$ bits. Thus, if a two-dimensional bar code has X*Y modules, the capacity of the two-dimensional bar code may be represented as $X*Y*\log_2 N$ bits. As one example, for a two-dimensional black-and-white bar code having 40*40 modules, the capacity is $40*40*\log_2 2 = 1600$ bits.

If a two-dimensional bar code, such as a watermark image code, has X*Y modules, k possible color values for each module, and n possible gray levels for each color value, the capacity can be represented as $X*Y*\log_2(k*(n-1)+1)$ bits. For example, for a two-dimensional bar code having 40*40 modules, 3 possible color values (red, blue, green), and 2 possible grayscale values (on and off), the capacity is $40*40*\log_2 4 = 3200$ bits. Accordingly, as the number of colors and the number of grayscales increase, a watermark image code may be able to hold a significant amount of data.

In some implementations, if a two-dimensional bar code, such as a watermark image code, has X*Y modules and N possible gray levels for each color value, the capacity can be represented as $$X*Y*\left(1-\frac{1}{f(N)}\right)\log_2(N)$$

bits, where f(N) represents a hidden factor of the source image. The hidden factor may be an empirically determined number for a particular source image. The purpose for the hidden factor is to allow the encoded information to be hidden from viewers.

In some implementations, a density value a and an error correction code r may be encoded in the watermark image code. A density value a specifies a percentage of the source image that may be encoded. The error correction code r is encoded in the source image by the specified percentage, and can be used to determine whether the decoded data is correct. In such cases, if a two-dimensional bar code has X*Y modules and N possible values for each module, the capacity of the two-dimensional bar code may be represented as $\alpha(1-r)X*Y*\log_2 N$ bits.

In some implementations, the system may decode the watermark image code to determine whether the input data may be retrieved. The system may also add additional processing to the watermark image code before the decoding to simulate real use cases. For example, the system may blur the encoded source image by 1%, or lighten the color of the encoded source image by 2% to determine whether the watermark image code would be reliable. As another example, the system may simulate capturing of the encoded image using a camera with a specific resolution to determine whether such a watermark image code would be reliable. If the input data may be retrieved, the system may output an output image that includes the watermark image code encoded in the source image. If there is an error in the decoding process, the system may adjust the encoding process before outputting the image.

In some implementations, the system may determine that a size of the input data exceeds a threshold. In response to determining that the size of the input data exceeds the threshold, the system may encode the input data as multiple watermark image codes in the source image. As an example, if the size of the input data is 2.1 GB and if the threshold for encoding a watermark image code is 0.5 GB, the system may encode 5 watermark image codes. In some implementations, the threshold may be associated with a size of the source image. For example, the larger the size of the source image, the higher the threshold. Thus, a large data file may be encoded using multiple watermark image codes within a source image. In some implementations, if a large data file is represented by multiple watermark image codes within a source image, functional elements may be encoded in the source image indicating that multiple watermark image codes have been encoded. For example, a functional element may inform the user that a next chapter of a book is available by scanning another watermark image code in the source image.

FIG. 5 an example encoding scheme using out-of-phase information for encoding watermark image codes. In general, one way to hide the encoded information from viewers is to encode the information in a first color plane 502, and encode a second color plane 504 with the same information that is out-of-phase from the information encoded in the first color plane 502. In some implementations, the information encoded in the first color plane 502 is 180 degrees out-of-phase from the information encoded in the second color plane 504.

When the two color planes 502 and 504 overlay on the source image, the combined encoded information cancel with each other, and the viewers would see the source image but not the encoded information. For example, referring to FIG. 5, the first color plane 502 includes 12 modules in one dimension, where each module may be encoded by a number of colors and a number of grayscales associated with each color. For a particular color (e.g., red), modules 2, 5, 6, 9, and 12 in the first color plane 502 are encoded with various grayscale levels having a positive phase. Modules 4 and 11 in the first color plane 502 are encoded with various grayscale levels having a negative phase. For the second color plane 504, modules 2, 5, 6, 9, and 12 are encoded with various grayscale levels that correspond to the encoded grayscale levels in the first color plane 502 but having a negative phase. Similarly, modules 4 and 11 in the second color plane 504 are encoded with various grayscale levels that correspond to the encoded grayscale levels in the first color plane 502 but having a positive phase. After combining (i.e., overlaying one on top of another) the first color plane 502 with the second color plane 504, the encoded grayscale levels in the first color plane 502 cancel with the encoded grayscale levels in the first color plane 504. The viewers as the result would not see the encoded information. At the decoder, the decoder may receive the first color plane 502 and the second color plane 504 that have been encoded in a source image. The decoder may extract and process the grayscale data for the particular color encoded in the first color plane 502.

Although FIG. 5 describes the encoding scheme using out-of-phase information for modules along one dimension, the out-of-phase information may be encoded in any two-dimensional source image to hide the encoded information from the viewers.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory program carrier for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array), an ASIC (application specific integrated circuit), or a GPGPU (General purpose graphics processing unit).

Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A computer-implemented method for encoding data in a source image, the method comprising:
   obtaining the source image having a plurality of pixels, wherein a pixel corresponds to a smallest element that can be encoded in the source image;
   obtaining input data to be encoded; and
   encoding the input data as one or more watermark image codes in particular pixels of the plurality of pixels of the source image by using a combination of one or more colors and a plurality of intensity levels, at least one color of the one or more colors being associated with at least three intensity levels of the plurality of intensity levels, the encoding comprising:
      determining a number of the colors for encoding the input data based on a number of the plurality of intensity levels for encoding the input data,
      determining a color distribution of the source image based on at least one of the number of the colors for encoding the input data or the number of the plurality of intensity levels for encoding the input data, and
      for at least one pixel of the particular pixels:
         selecting, based on a corresponding value of a respective portion of the input data to be encoded in the pixel, a particular intensity level from at least three intensity levels associated with a particular color of the one or more colors; and
encoding the respective portion of the input data in the pixel of the source image based on the determined color distribution of the source image by modifying at least one of a determined color of the pixel or a determined intensity level of the pixel with the particular color having the particular intensity level.

2. The method of claim 1, further comprising:
identifying an encoding region of the source image for encoding the input data,
wherein the encoding further comprises encoding the input data in the encoding region of the source image.

3. The method of claim 2, wherein identifying the encoding region of the source image further comprises determining a size of the encoding region based on a predetermined size value.

4. The method of claim 2, wherein identifying the encoding region of the source image further comprises determining a size of the encoding region based on a number of the one or more colors for encoding the input data.

5. The method of claim 2, wherein identifying the encoding region of the source image further comprises determining a size of the encoding region based on the number of the plurality of intensity levels associated with the one or more colors.

6. The method of claim 2, further comprising encoding one or more functional elements in the source image.

7. The method of claim 6, wherein the one or more functional elements include a finder pattern for determining a position of the encoding region.

8. The method of claim 6, wherein the one or more functional elements are encoded in the encoding region.

9. The method of claim 1, further comprising obtaining characteristics of the source image.

10. The method of claim 9, further comprising:
determining, based on the characteristics of the source image, (i) a number of colors for encoding the input data, wherein the number of colors include the one or more colors, and (ii) a number of intensity levels associated with each of the one or more colors for encoding the input data, wherein the number of intensity levels include the plurality of intensity levels.

11. The method of claim 9, wherein the characteristics of the source image include a number of colors associated with the source image, the color distribution of the source image, a size of the source image, a pixel size of the source image, or a number of intensity levels associated with each color of the colors associated with the source image.

12. The method of claim 1, wherein the encoding further comprises:
determining the one or more colors for encoding the input data; and
for each color of the determined colors, determining a number of respective intensity levels associated with the color for encoding the input data.

13. The method of claim 12, wherein determining the number of respective intensity levels associated with the color further comprises determining the number of respective intensity levels associated with the color based on the number of the one or more colors.

14. The method of claim 1, wherein encoding the respective portion of the input data in the pixel of the source image further comprises:
encoding the respective portion of the input data by using the particular color having the particular intensity level and a first phase in a first color plane associated with the pixel of the source image; and
encoding the respective portion of the input data by using the particular color having the particular intensity level and a second phase in a second color plane associated with the pixel of the source image.

15. The method of claim 14, wherein a difference between the first phase and the second phase is 180 degrees.

16. The method of claim 14, wherein encoding the respective portion of the input data by using the particular color having the particular intensity level in the module of the source image further comprises:
combining the first color plane and the second color plane to hide the encoded input data in the source image.

17. The method of claim 1, wherein the input data includes text information, a link to a website, a digital image, an audio file, or a video file.

18. A method for decoding data embedded in a source image, the method comprising:
obtaining an encoded source image having a plurality of pixels, wherein a pixel corresponds to a smallest element that can be encoded in the source image;
extracting, from particular pixels of the plurality of pixels, encoded data, wherein the encoded data is encoded with a combination of one or more colors and a plurality of intensity levels, at least one color of the one or more colors being associated with at least three intensity levels of the plurality of intensity levels, and wherein, in at least one pixel of the particular pixels, a respective portion of the encoded data is encoded by selecting a respective intensity level from at least three intensity levels associated with a particular color of the one or more colors and modifying at least one of a color of the pixel or an intensity of the pixel with the particular color having the respective intensity level, the color of the pixel and the intensity of the pixel being determined based on a color distribution of the source image that is determined based on at least one of a number of the colors for encoding the input data or a number of the plurality of intensity levels for encoding the input data, the number of the colors for encoding the input data being determined based on the number of the plurality of intensity levels for encoding the input data;
decoding the encoded data to generate decoded data; and
outputting the decoded data.

19. The method of claim 18, further comprising reducing noise associated with the encoded source image.

20. The method of claim 19, wherein reducing the noise associated with the encoded source image further comprises using a mean value filter to reduce the noise associated with the encoded source image.

21. The method of claim 20, wherein the mean value filter is a geometric mean value filter.

22. The method of claim 19, wherein reducing the noise associated with the encoded source image further comprises using a low-pass filter to reduce the noise associated with the encoded source image.

23. The method of claim 22, wherein the low-pass filter is a linear low-pass filter or a non-linear low-pass filter.

24. The method of claim 18, wherein decoding the encoded data further comprises decoding the encoded data based on intensity information associated with the one or more pixels.

25. The method of claim 18, further comprising identifying an encoding region of the encoded source image.

26. The method of claim 25, wherein identifying the encoding region of the encoded source image comprises identifying a finder pattern for determining a position of the encoding region.

27. The method of claim 18, wherein extracting the encoded data further comprises:
    extracting a first color plane and a second color plane from the encoded source image, wherein the second color plane has been encoded out-of-phase with respect to the first color plane; and
    extracting the encoded data from the first color plane.

28. The method of claim 18, wherein the decoded data includes text information, a link to a website, a digital image, an audio file, or a video file.

29. A computer-implemented method of encoding data as one or more watermark image codes in a source image, the method comprising:
    obtaining the source image having a plurality of pixels, wherein a pixel corresponds to a smallest element that can be encoded in the source image;
    obtaining input data to be encoded; and
    encoding the input data as the one or more watermark image codes in particular pixels of the plurality of pixels of the source image by using a combination of a plurality of colors and a plurality of grayscale levels, each color of the plurality of colors being associated with at least three grayscale levels of the plurality of grayscale levels,
    wherein encoding the input data comprises:
        determining a number of the colors for encoding the input data based on a number of the plurality of grayscale levels for encoding the input data;
        determining a color distribution of the source image based on at least one of the number of the colors for encoding the input data or the number of the plurality of grayscale levels for encoding the input data; and
        for each pixel of the particular pixels,
            selecting, based on a corresponding value of a respective portion of the input data to be code in the pixel, a particular color from the plurality of colors and a particular grayscale level from at least three grayscale levels associated with the particular color; and
            encoding the respective portion of the input data in the pixel of the source image based on the determined color distribution of the source image by modifying at least one of a determined color of the pixel or a determined intensity of the pixel with the particular color having the particular grayscale level.

30. The method of claim 29, further comprising:
    determining the plurality of colors and the plurality of grayscale levels based on a product of the number of the colors and the number of the grayscale levels.

31. The method of claim 29, further comprising:
    determining the plurality of colors and the plurality of grayscale levels based on one or more characteristics of code scanning hardware for decoding the encoded data in the source image.

32. The method of claim 1, wherein determining the color distribution of the source image comprises:
    determining the color distribution of the source image based on a resolution of the one or more watermark image codes.

33. The method of claim 1, wherein determining the color distribution of the source image comprises:
    determining the color distribution of the source image based on one or more characteristics of an image capturing device for capturing the source image encoded with the one or more watermark image codes and one or more characteristics of a decoder for decoding the one or more watermark image codes encoded in the source image.

* * * * *